(12) United States Patent
Jun

(10) Patent No.: US 10,754,571 B2
(45) Date of Patent: Aug. 25, 2020

(54) STORAGE DEVICE AND METHOD OF OPERATING THE SAME

(71) Applicant: SK hynix Inc., Gyeonggi-do (KR)

(72) Inventor: Jang Hwan Jun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 52 days.

(21) Appl. No.: 16/120,956

(22) Filed: Sep. 4, 2018

(65) Prior Publication Data

US 2019/0243576 A1 Aug. 8, 2019

(30) Foreign Application Priority Data

Feb. 6, 2018 (KR) .................... 10-2018-0014762

(51) Int. Cl.
*G06F 12/00* (2006.01)
*G06F 3/06* (2006.01)
*G06F 12/10* (2016.01)

(52) U.S. Cl.
CPC ............ *G06F 3/0647* (2013.01); *G06F 3/064* (2013.01); *G06F 3/0608* (2013.01); *G06F 3/0652* (2013.01); *G06F 3/0673* (2013.01); *G06F 12/10* (2013.01); *G06F 2212/1044* (2013.01)

(58) Field of Classification Search
CPC ...... G06F 3/0647; G06F 3/0608; G06F 3/064; G06F 3/0652; G06F 3/0673; G06F 12/10; G06F 2212/1044
See application file for complete search history.

(56) References Cited

U.S. PATENT DOCUMENTS

2016/0070652 A1\* 3/2016 Sundararaman ...... G06F 3/0619 711/154

FOREIGN PATENT DOCUMENTS

KR 1020170005915 1/2017
KR 1020170070922 6/2017

\* cited by examiner

*Primary Examiner* — Shawn X Gu
(74) *Attorney, Agent, or Firm* — IP & T Group LLP

(57) ABSTRACT

Provided herein may be a storage device and a method of operating the storage device. The storage device includes a memory device including a plurality of system blocks; and a memory controller configured to perform a read reclaim operation of copying system data stored in a selected system block to another one of the plurality of system blocks using information obtained during loading of the system data into the selected system block.

17 Claims, 13 Drawing Sheets

SYSTEM BLOCK SET0

| PG | ORIGINAL BLK0 | Duplication BLK0 |
|---|---|---|
| 1 | SYSTEM DATA | SYSTEM DATA |
| 2 | SYSTEM DATA | SYSTEM DATA |
| 3 | SYSTEM DATA | SYSTEM DATA |
| 4 | ERASED | ERASED |
| 5 | ERASED | ERASED |
| 6 | ERASED | ERASED |
| 7 | ERASED | ERASED |
| 8 | ERASED | ERASED |
| 9 | ERASED | ERASED |
| 10 | ERASED | ERASED |
| 11 | ERASED | ERASED |
| 12 | ERASED | ERASED |
| 13 | ERASED | ERASED |
| 14 | ERASED | ERASED |
| 15 | ERASED | ERASED |

(B)

SYSTEM BLOCK SET0

| PG | ORIGINAL BLK0 | Duplication BLK0 |
|---|---|---|
| 1 | UECC | SYSTEM DATA |
| 2 | UECC | SYSTEM DATA |
| 3 | UECC | SYSTEM DATA |
| 4 | UECC | ERASED |
| 5 | UECC | ERASED |
| 6 | UECC | ERASED |
| 7 | UECC | ERASED |
| 8 | UECC | ERASED |
| 9 | UECC | ERASED |
| 10 | UECC | ERASED |
| 11 | UECC | ERASED |
| 12 | UECC | ERASED |
| 13 | UECC | ERASED |
| 14 | UECC | ERASED |
| 15 | UECC | ERASED |

FIG. 4

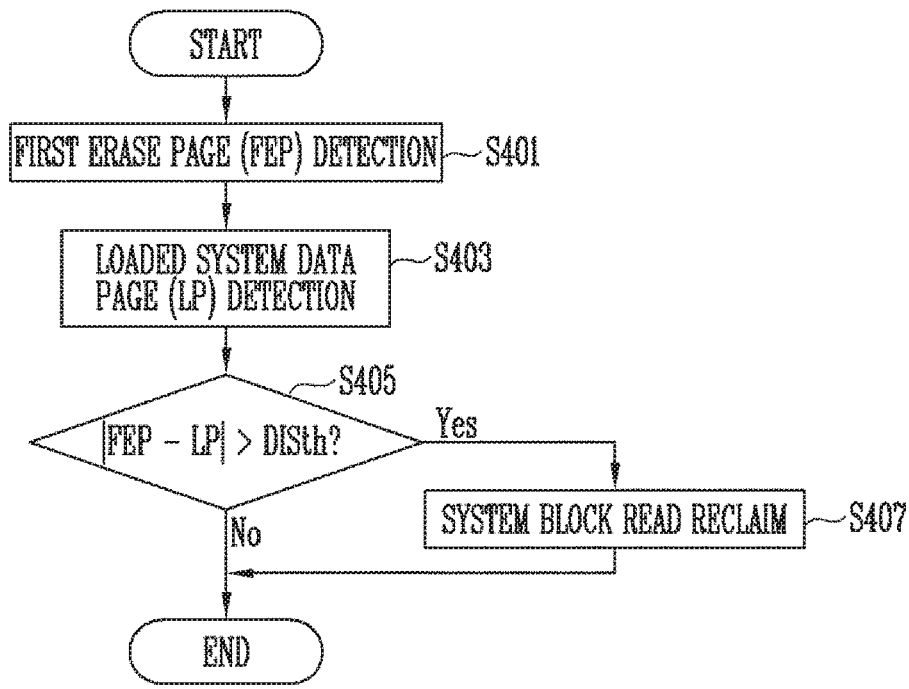

FIG. 7

| PG | System Block Set0 ORIGINAL | DUPLICATION |
|---|---|---|
| 0 | SYSTEM DATA | SYSTEM DATA |
| 1 | SYSTEM DATA | SYSTEM DATA |
| 2 | SYSTEM DATA | SYSTEM DATA |
| 3 | SYSTEM DATA | SYSTEM DATA |
| 4 | UECC | ERASED |
| 5 | UECC | ERASED |
| 6 | UECC | ERASED |
| 7 | UECC | ERASED |
| EOP | ERASED | ERASED |

| PG | System Block Set1 ORIGINAL | DUPLICATION |
|---|---|---|
| 0 | SYSTEM DATA | SYSTEM DATA |
| 1 | ERASED | ERASED |
| 2 | ERASED | ERASED |
| 3 | ERASED | ERASED |
| 4 | ERASED | ERASED |
| 5 | ERASED | ERASED |
| 6 | ERASED | ERASED |
| 7 | ERASED | ERASED |
| EOP | ERASED | ERASED |

| PG | System Block Set2 ORIGINAL | DUPLICATION |
|---|---|---|
| 0 | ERASED | ERASED |
| 1 | ERASED | ERASED |
| 2 | ERASED | ERASED |
| 3 | ERASED | ERASED |
| 4 | ERASED | ERASED |
| 5 | ERASED | ERASED |
| 6 | ERASED | ERASED |
| 7 | ERASED | ERASED |
| EOP | ERASED | ERASED |

| PG | System Block Set3 ORIGINAL | DUPLICATION |
|---|---|---|
| 0 | ERASED | ERASED |
| 1 | ERASED | ERASED |
| 2 | ERASED | ERASED |
| 3 | ERASED | ERASED |
| 4 | ERASED | ERASED |
| 5 | ERASED | ERASED |
| 6 | ERASED | ERASED |
| 7 | ERASED | ERASED |
| EOP | ERASED | ERASED |

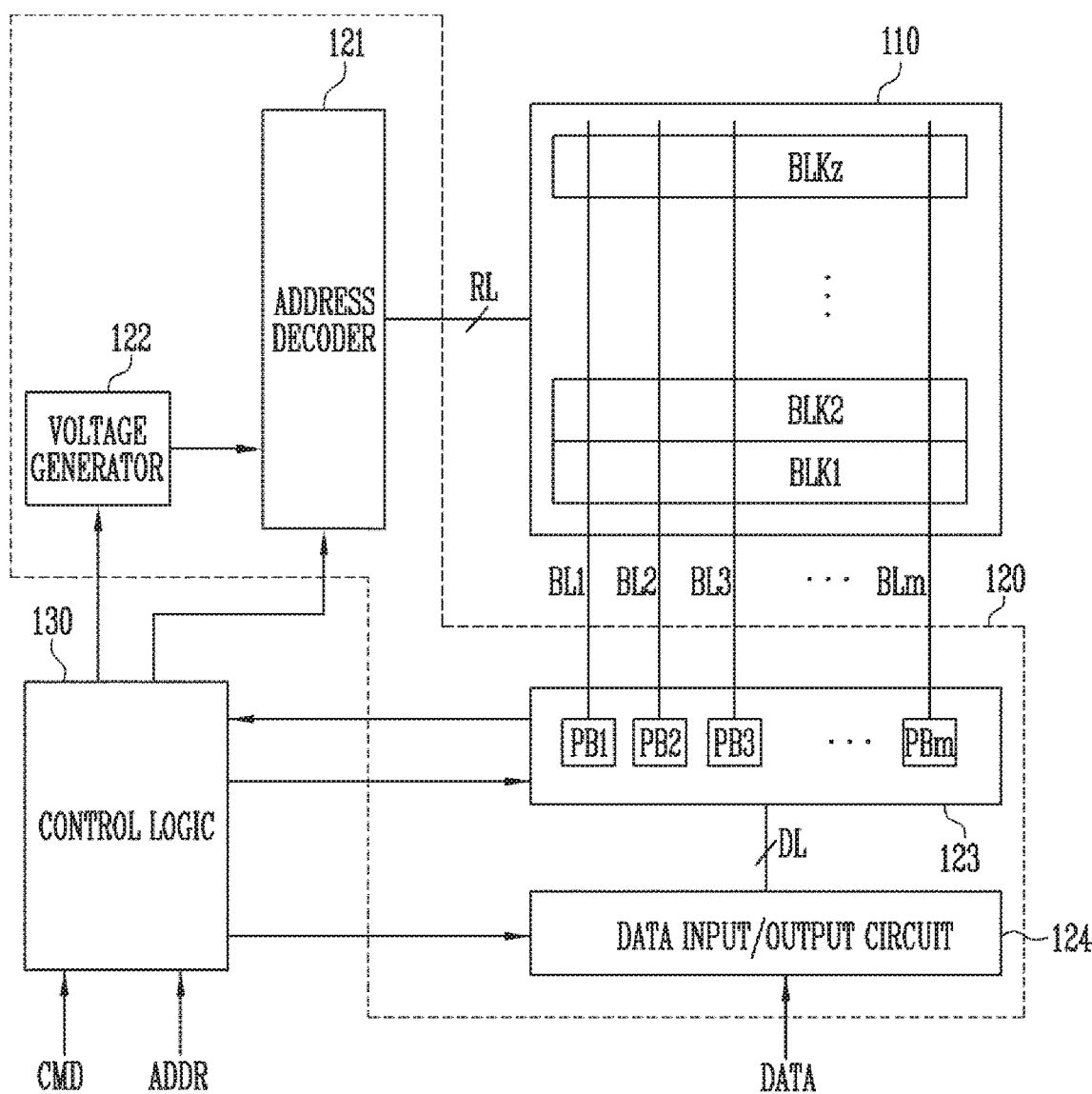

STORAGE DEVICE AND METHOD OF OPERATING THE SAME

CROSS-REFERENCE TO RELATED APPLICATION

The present application claims priority to Korean patent application number 10-2018-0014762, filed on Feb. 6, 2018, which is incorporated herein by reference in its entirety.

BACKGROUND

1. Field of Invention

Various embodiments of the present disclosure generally relate to an electronic device and, more particularly, to a storage device and a method of operating the storage device.

2. Description of Related Art

Generally, a storage device is a device which stores data under the control of a host device such as a computer, a smartphone, or a smartpad. According to the type of device provided to store data, examples of the storage device may be classified into a device such as a hard disk drive (HDD) which stores data in a magnetic disk, and a device such as a solid-state drive (SSD) or a memory card which stores data in a semiconductor memory, particularly, a nonvolatile memory.

The storage device may include a memory device to which data is stored, and a memory controller configured to store data to the memory device. The memory device may be classified into a volatile memory and a nonvolatile memory. Representative examples of the nonvolatile memory include a read only memory (ROM), a programmable ROM (PROM), an electrically programmable ROM (EPROM), an electrically erasable programmable ROM (EEPROM), a flash memory, a phase-change random access memory (PRAM), a magnetic RAM (MRAM), a resistive RAM (RRAM), a ferroelectric RAM (FRAM), etc.

SUMMARY

Various embodiments of the present disclosure are directed to a storage device including a memory controller which performs a read reclaim operation on a system block, and a method of operating the storage device.

An embodiment of the present disclosure provides for a storage device including: a memory device including a plurality of system blocks; and a memory controller configured to perform a read reclaim operation of copying system data stored in a selected system block to another one of the plurality of system blocks using information obtained during loading of the system data into the selected system block.

An embodiment of the present disclosure provides for a method of operating a memory controller configured to control a memory device including a plurality of system blocks, the method including: performing a system block loading operation of loading system data stored in a selected system block among the plurality of system blocks; and performing a read reclaim operation of copying the system data to another one of the plurality of system blocks using information obtained during the system block loading operation.

An embodiment of the present disclosure provides for a memory system including: a memory device including: a source block storing a system data; and a destination block storing a copy of the system data; and a controller including an operation memory, and suitable for: controlling the memory device to load the system data from the source block onto the operation memory; detecting distance between a first erased system page and a loaded system page storing the loaded system data in the source block; and controlling the memory device to copy the system data from the source block into the destination block according to the distance.

BRIEF DESCRIPTION OF THE DRAWINGS

FIG. 3 is a diagram illustrating a phenomenon caused by frequently performing read operations on a system block in accordance with an embodiment of the present disclosure.

FIG. 4 is a flowchart illustrating a method of operating the memory controller in accordance with an embodiment of the present disclosure.

FIG. 7 is a diagram illustrating transfer of data of a system block according to the read reclaim operation in accordance with an embodiment of the present disclosure.

FIG. 8 is a diagram illustrating a configuration of the memory device shown in FIG. 1 in accordance with an embodiment of the present disclosure.

DETAILED DESCRIPTION

Figure 1:
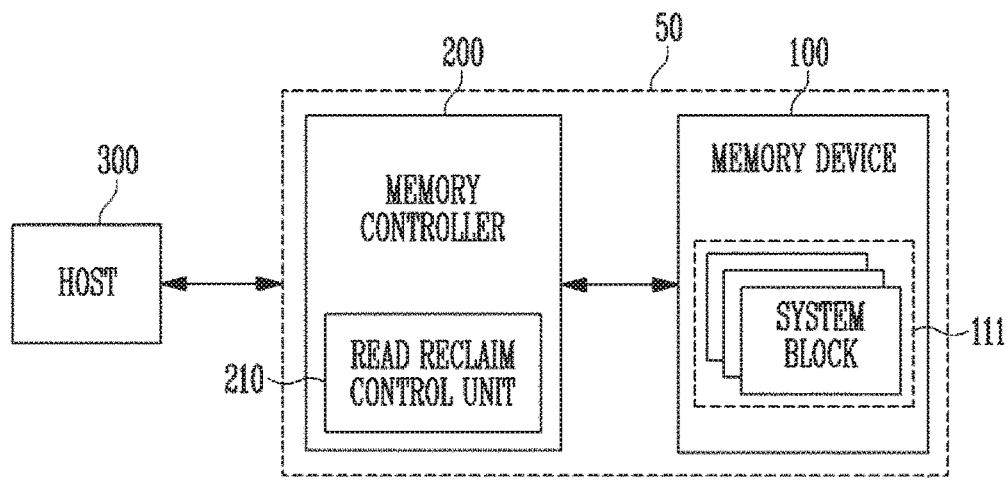
FIG. 1 is a diagram illustrating a storage device including a memory controller operatively coupled to a memory device in accordance with an embodiment of the present disclosure.

Example embodiments of the present invention will now be described more fully hereinafter with reference to the accompanying drawings; however, the present invention may be embodied in different forms and should not be construed as limited to the embodiments set forth herein. Rather, these embodiments are provided so that this disclosure of the invention will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present.

Hereinafter, embodiments will be described with reference to the accompanying drawings. Embodiments are described herein with reference to cross-sectional illustrations that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as "first" and "second" may be used to describe various components, but they should not limit the various components. Those terms are only used for the purpose of differentiating a component from other components. For example, a first component may be referred to as a second component, and a second component may be referred to as a first component and so forth without departing from the spirit and scope of the present disclosure. Furthermore, "and/or" may include any one of or a combination of the components mentioned.

Furthermore, a singular form may include a plural from as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

It is also noted that in this specification, "connected/coupled" refers to one component not only directly coupling another component but also indirectly coupling another component through an intermediate component. On the other hand, "directly connected/directly coupled" refers to one component directly coupling another component without an intermediate component.

FIG. 1 is a diagram illustrating a storage device 50 including a memory controller 200 in accordance with an embodiment of the present disclosure.

Referring to FIG. 1, the storage device 50 may also include a memory device 100 operatively coupled to the memory controller 200.

The memory device 100 may store data therein. The memory device 100 may operate under the control of the memory controller 200. The memory device 100 may include a memory cell array including a plurality of memory cells configured to store data therein. The memory cell array may include a plurality of memory blocks. Each memory block may include a plurality of memory cells. The memory device 100 may store data to a memory block in a sequential or random order under control of the memory controller 200. In various embodiments, the memory device 100 may be a double data rate synchronous dynamic random access memory (DDR SDRAM), a low power double data rate4 (LPDDR4) SDRAM, a graphics double data rate (DDDR) SDRAM, a low power DDR (LPDDR), a rambus dynamic random access memory (RDRAM), a NAND flash memory, a vertical NAND flash memory, a NOR flash memory device, a resistive random access memory (RRAM), a phase-change memory (PRAM), a magnetoresistive random access memory (MRAM), a ferroelectric random access memory (FRAM), or a spin transfer torque random access memory (STT-RAM).

In various embodiments, the memory device 100 may be embodied in a three-dimensional array structure. The present disclosure may be applied not only to a flash memory in which a charge storage layer is formed of a conductive floating gate (FG), but also to a charge trap flash (CTF) memory in which a charge storage layer is formed of an insulating layer.

The memory device 100 may include system blocks 111. Each system block 111 may store system data. The system information may include setting information needed to drive the storage device 50. For example, the system information may include mapping table information which is used to translate a logical address provided from a host into physical addresses of memory cells included in the memory device 100.

When power is supplied to the storage device 50, the memory controller 200 may load the mapping table information stored in the system block 111. The memory controller 200 may perform a system block loading operation of loading the mapping table information stored in the system block 111 onto a memory (not shown) included in the memory controller 200. Thereafter, the memory controller 200 may process a request of the host 300 using the mapping table information loaded onto the memory (not shown) of the controller. In various embodiments, the memory in the memory controller 200 in which the mapping table is loaded may be a volatile memory such as, for example, a DRAM or an SRAM.

The memory device 100 may receive a command and an address from the memory controller 200 and access a region of the memory cell array which is selected by the address. In other words, the memory device 100 may perform an operation corresponding to a received command on a region of the memory cell array selected by the address received together with the received command. For example, the memory device 100 may perform a write (program) operation, a read operation, and an erase operation. During a program operation, the memory device 100 may program data to the region selected by the address. During a read operation, the memory device 100 may read data from the region selected by the address. During an erase operation, the memory device 100 may erase data from the region selected by the address.

The memory controller 200 may control an operation of the memory device 100 in response to a request of a host 300 or regardless of the request of the host 300.

For example, the memory controller 200 may control the memory device 100 to perform a program operation, a read operation, or an erase operation in response to a request from the host 300. During the program operation, the memory controller 200 may provide a program command, a physical address, and data to the memory device 100. During the read operation, the memory controller 200 may provide a read command and a physical address to the memory device 100. During the erase operation, the memory controller 200 may provide an erase command and a physical address to the memory device 100.

In various embodiments, the memory controller 200 may autonomously generate a program command, an address and data without a request from the host 300 and transmit them to the memory device 100. For example, the memory controller 200 may provide a command, an address and data to the memory device 100 to perform background operations such as a program operation for wear leveling, or a program operation for garbage collection.

The memory controller 200 may execute firmware for controlling the memory device 100. In the case where the memory device 100 is a flash memory device, the memory controller 200 may manage firmware such as a flash translation layer (FTL) for controlling communication between the host 300 and the memory device 100. In detail, the memory controller 200 may translate a logical address included in a request from the host 300 to a physical address.

In various embodiments, the memory controller 200 may include an error correction code (ECC) engine (not shown) configured to perform error bit correction. The ECC engine may include an ECC encoder and an ECC decoder. The ECC encoder may perform an error correction encoding operation on original data to be stored to the memory device 100, and generate write data with a parity bit. The parity bit may be stored in the memory device 100. The ECC decoder may perform an error correction decoding operation on data read from the memory device 100. If the number of error bits included in the read data exceeds the maximum number of bits capable of being corrected by the ECC engine, the error correction decoding operation may fail. The failure of the error correction decoding operation indicates that the read operation has failed. This may indicate that the original data has not been recovered according to the read operation. On the other hand, if the number of error bits included in the read data does not exceed the maximum number of bits capable of being corrected by the ECC engine, the error correction decoding operation may succeed. The success of the error correction decoding operation indicates that the read operation has passed. This may indicate that the original data has been recovered according to the read operation.

In various embodiments of the present disclosure, the memory controller 200 may perform a read reclaim operation on the system block 111. For this operation, the memory controller 200 may include a read reclaim control unit 210.

A representative example of the system information stored in the system block 111 may be mapping table information. The mapping table information may be periodically or randomly updated rather than being updated each time an operation is performed on the memory device 100. Therefore, compared to normal data blocks in which user data is stored, the count of read operations to the system block 111 may be larger than that of write operations to the system block 111. Due to repetition of read operations, the threshold voltage of memory cells stored in the system block 111 may be disturbed (this is referred to as "read disturb").

Data stored in the system block 111 is important data which are used for managing the operation of the storage device 50. Hence, to prevent data damage in the system block 111 due to the read disturb, the system block 111 may include a duplication system block configured to store a copy of the system data (i.e., identical data) stored in the original system block. Generally, if the system data stored in the original system block is damaged, the memory controller 200 may recover the system data using the duplication system data which are stored in the duplication system block. Therefore, the time taken to load the system block may be increased, whereby the time taken to boot the storage device 50 may be increased.

In various embodiments, if the count of read operations performed on the system block 111 is a preset count or more, the memory controller 200 may perform a read reclaim operation of copying system data stored in a corresponding system block 111 to another system block 111. For this operation, the memory controller 200 may include the read reclaim control unit 210. To determine whether to perform a read reclaim operation on the system block 111, the memory controller 200 may use information obtained during a system block loading operation of loading data from the system block 111 onto the volatile memory (not illustrated) of the memory controller 200.

The read reclaim control unit 210 may control a read reclaim operation which is performed on the system block 111. The read reclaim operation on the system block 111 will be described in more detail later herein with reference to FIGS. 2 to 7.

Figure 2:
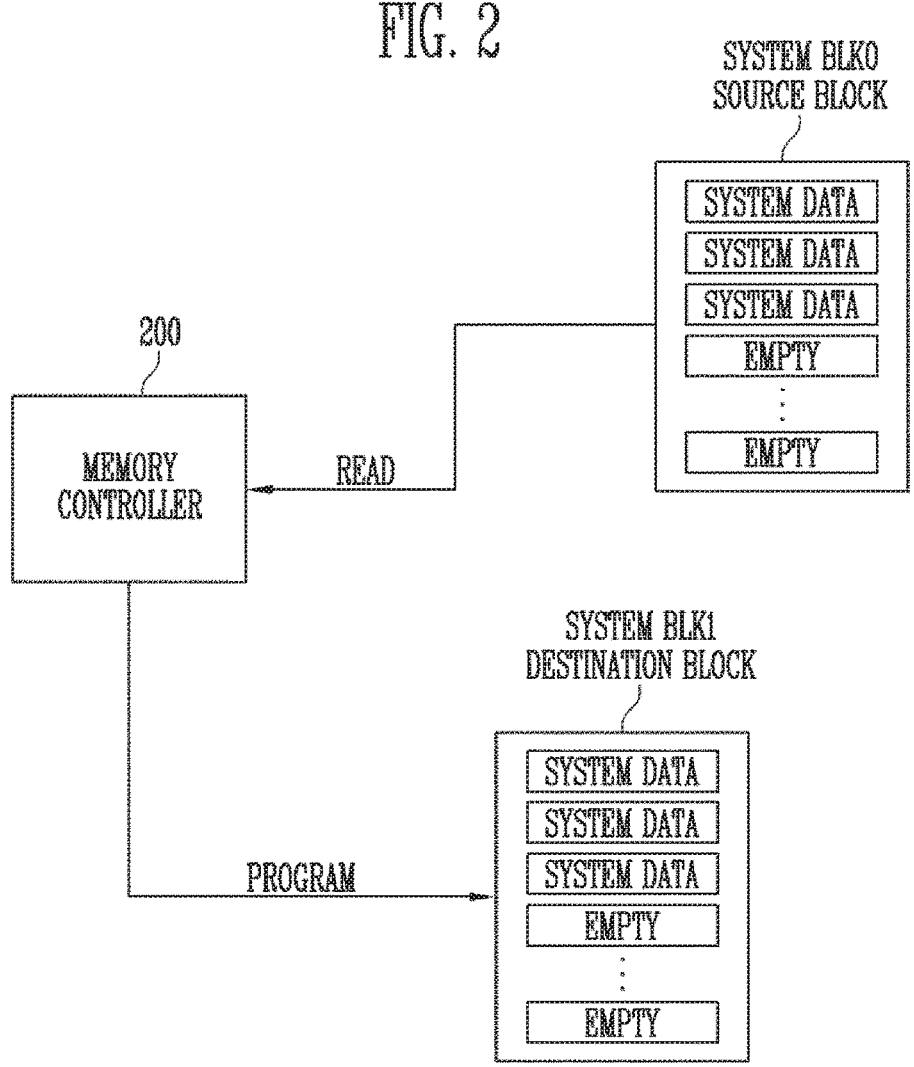
FIG. 2 is a diagram illustrating a read reclaim operation on a system block of the memory device shown in FIG. 1 in accordance with an embodiment of the present disclosure.

FIG. 2 is a diagram illustrating a read reclaim operation on the system block 111 of FIG. 1.

Referring to FIGS. 1 and 2, the memory device 100 may include a plurality of system blocks 111.

In FIG. 2, it is assumed that system block 0 SYSTEM BLK0 is selected as a source block.

The read reclaim operation on the system block may include a read operation READ on the source block and a program operation PROGRAM on a destination block.

The memory controller 200 may read system data stored in the system block 0 SYSTEM BLK0 that is the source block. The read system data may be provided to the memory controller 200. The memory controller 200 may perform a program operation of storing the system data read from system block 0 SYSTEM BLK0 that is the source block to system block 1 SYSTEM BLK1 that is the destination block.

Detailed description of the program operation of storing the system data to system block 1 SYSTEM BLK1 that is the destination block will be omitted because it is the same as that of a scheme of storing user data to a normal block.

FIG. 3 is a diagram illustrating a phenomenon caused by frequently performing read operations on the system block in accordance with an embodiment of the present disclosure.

FIG. 3 illustrates an example of the system block. In detail, (A) of FIG. 3 illustrates the system block in which no damage to data due to read disturb, and (B) of FIG. 3 illustrates the system block with data that have been damaged because of read disturb.

The system block is a system block set including an original system block and a duplication system block. For example, system block set 0 SYSTEM BLOCK SET0 may include original system block 0 ORIGINAL BLK0 and duplication system block 0 DUPLICATION BLK0.

Each of the original system block 0 ORIGINAL BLK0 and the duplication system block 0 DUPLICATION BLK0 included in the system block set 0 SYSTEM BLOCK SET0 may include first to fifteenth pages. Here, it is noted that the number of pages included in each of original system block 0 ORIGINAL BLK0 and duplication system block 0 DUPLICATION BLK0 is just for illustration purposes and that the number of pages is not limited to that of the illustrated embodiment of FIG. 3.

Original system block 0 ORIGINAL BLK0 and duplication system block 0 DUPLICATION BLK0 included in system block set 0 SYSTEM BLOCK SET0 may be sequentially programmed in a sequence from the first page PG1 to the fifteenth pages PG15. For example, in the state shown in FIG. 3(A), three pages have been programmed and subsequent system data to be stored may be sequentially stored to pages in a sequence from the fourth page PG4 to the fifteenth page PG15.

Hereinafter, a system block loading operation of loading system data SYSTEM DATA from the system block 111 to a volatile memory of the controller 200 when power is supplied to the storage device 50 will be described with reference to FIG. 1.

First, the memory controller 200 may detect a first erased page in original system block 0 ORIGINAL BLK0. For example, the memory controller 200 may detect a first erased page in original system block 0 ORIGINAL BLK0 using a binary scan scheme. For example, the first erased page in the embodiment of FIG. 3(A) may be the fourth page PG4 that is adjacent to the first to third pages PG1 to PG3 in which system data SYSTEM DATA has been stored.

In the case where the first erased page is detected in the binary scan scheme, the memory controller 200 may read pages included in original system block 0 ORIGINAL BLK0 using a default read voltage without performing an error correction operation on read data. Here, the default read voltage may be a read voltage making it possible to determine memory cells having threshold voltages of an erased state.

If the fourth page PG4 that is the first erased page is detected, the memory controller 200 may read page data in a direction opposite to a program direction from the fourth page PG4 that is the first erased page. In other words, the memory controller 200 may read in a sequence reverse to a sequence in which data is stored to the pages (i.e., in a backward tracking manner).

The memory controller 200 may read the system data SYSTEM DATA stored in the third page PG3 of original system block 0 ORIGINAL BLK0, and store the system data SYSTEM DATA to the volatile memory included in the memory controller 200 (this operation may be referred to as "system data loading operation").

If a sudden power-off (SPO) event in which the power of the storage device 50 is lost occurs, the storage device 50 may repeatedly perform, each time power is re-supplied, the system loading operation of loading the system data.

In other words, due to frequent SPO events, read operations may be repeatedly performed on original system block 0 ORIGINAL BLK0. In this case, the data of original system block 0 ORIGINAL BLK0 may be damaged because of read disturb (refer to FIG. 3(B)).

Referring to FIG. 3(B), although in FIG. 3(A) the fourth page PG4 is the first erased page, a read count may be continuously increased by the read disturb in FIG. 3(B). Furthermore, because a read fail may be caused by damage to the system data stored in the third page PG3, the memory controller 200 may recover the system data using duplication system block 0 DUPLICATION BLK0. If SPO events repeatedly occur, data stored in the duplication system block 0 DUPLICATION BLK0 may also be damaged by repeated read operations. As a result, the time taken to recover the system data may be greatly increased.

FIG. 4 is a flowchart illustrating a method of operating the memory controller 200 in accordance with an embodiment of the present disclosure.

Referring to FIG. 4, at step S401, the memory controller 200 may detect a first erased page (FEP) of the system block 111. For example, the memory controller 200 may detect the first erased page using the binary scan scheme which will be explained with an example herein after in reference to FIG. 5.

At step S403, the memory controller 200 may detect a loaded system data page representing a system data page which is loaded. For example, the memory controller 200 may read page data in reverse direction of the program operation with reference to the first erased page in the system block 111. The memory controller 200 may read page data until the read operation passes. When system data is normally loaded, the memory controller 200 may detect a corresponding page as a loaded system data page.

At step S405, the memory controller 200 may determine whether a distance between the loaded system data page and the first erased page exceeds a threshold distance DISth. If an operation of reading erased pages of the system block fails due to frequent read operations, the distance between the first erased page and the loaded system data page may be increased. The threshold distance DISth may be the basis on which the read reclaim operation is performed. For example, if the distance between the first erased page and the loaded system data page exceeds the threshold distance DISth, an operation of recovering the system data using system data of the duplication system block rather than the original system block may be required. The threshold distance DISth may be experimentally obtained and previously stored to the memory controller 200.

As a result of the determination of step S405, if the distance between the first erased page and the loaded system data page exceeds the threshold distance DISth, the process proceeds to step S407. If the distance between the first erased page and the loaded system data page does not exceed the threshold distance DISth, the system block loading operation may be terminated.

At step S407, the memory controller 200 may perform a read reclaim operation on the system block. For example, the memory controller 200 may copy system data from the source block to the destination block.

Figure 5:
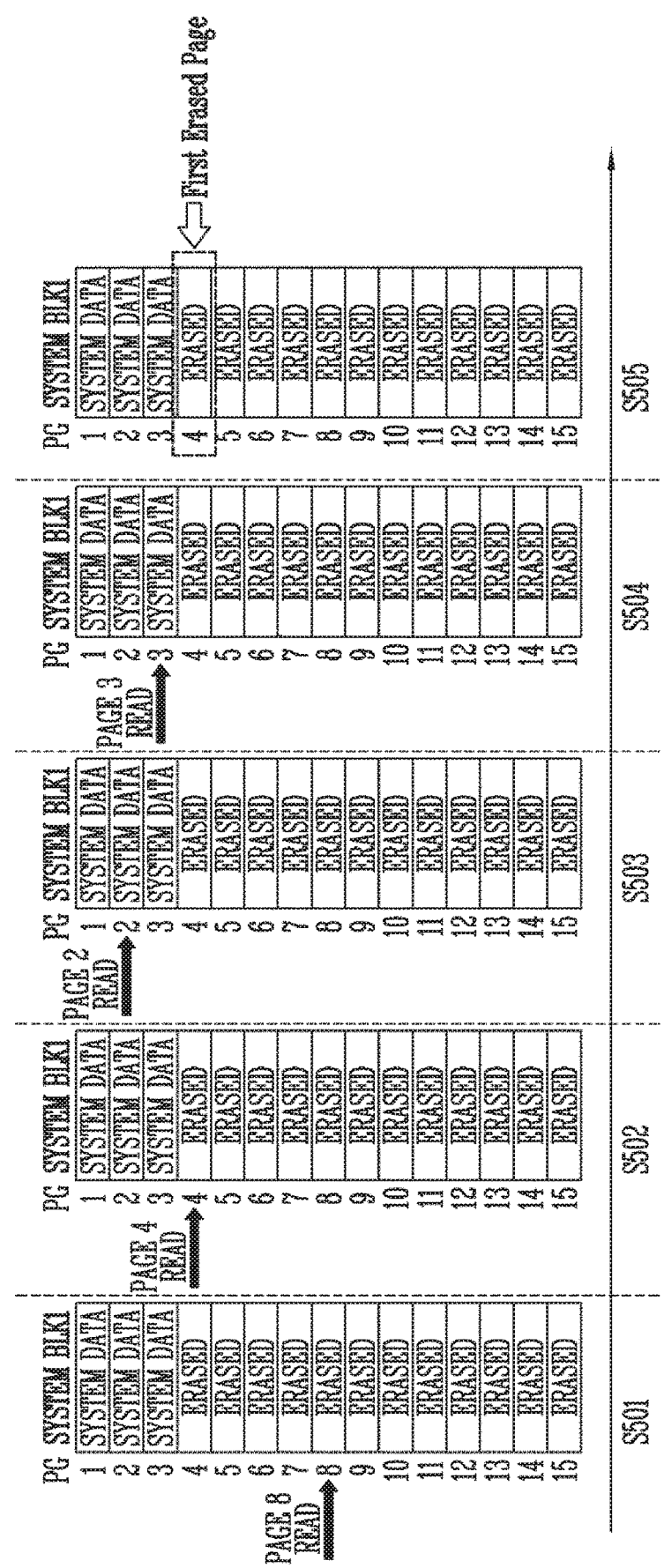
FIG. 5 is a diagram illustrating a method of detecting a first erased page according to a binary scan scheme described with reference to FIG. 4 in accordance with an embodiment of the present disclosure.

FIG. 5 is a diagram illustrating a method of detecting a first erased page according to the binary scan scheme described with reference to FIG. 4 in accordance with an embodiment of the present disclosure.

Referring to FIG. 5, in section S501, the memory controller 200 may read an eighth page PG8 that is disposed in a median portion of first to fifteenth pages PG1 to PG15 included in the system block SYSTEM BLK1. The eighth page PG8 is an erased page ERASED. Because data is sequentially written to the system block SYSTEM BLK1 in a direction from the first page PG1 to the fifteenth page PG15, it may be determined that all of the eighth to fifteenth pages PG8 to PG15 are erased pages ERASED. Therefore, the memory controller 200 may expect that the first erased page FIRST ERASED PAGE is present in the first to eighth pages PG1 to PG8.

In section S502, the memory controller 200 may read the fourth page PG4 that is disposed in a median portion of the first to seventh pages PG1 to PG7. The fourth page PG4 is an erased page ERASED. Because data is sequentially written to the system block SYSTEM BLK1 in a direction from the first page PG1 to the fifteenth page PG15, it may be determined that all of the fourth to seventh pages PG4 to PG7 are erased pages ERASED. Therefore, the memory controller 200 may expect that the first erased page FIRST ERASED PAGE is present in the first to fourth pages PG1 to PG4.

In section S503, the memory controller 200 may read the second page PG2 that is disposed in a median portion of the first to third pages PG1 to PG3. The second page PG2 may be a programmed page PROGRAMMED to which system data has been stored. In other words, the memory controller 200 may determine that the second page PG2 is not an erased page ERASED. Because data is sequentially written to the system block SYSTEM BLK1 in a direction from the first page PG1 to the fifteenth page PG15 it may be determined that both the first page PG1 and the second page PG2 are programmed pages PROGRAMMED. Therefore, the memory controller 200 may expect that either the third page PG3 or the fourth page PG4 is the first erased page FIRST ERASED PAGE.

In section S504, the memory controller 200 may read the third page PG3 that is disposed in a median portion of the second page PG2 and the fourth page PG4. The third page PG3 may be a programmed page PROGRAMMED to which system data has been stored. In other words, the memory controller 200 may determine that the third page PG3 is not an erased page ERASED. Because data is sequentially written to the system block SYSTEM BLK1 in a direction from the first page PG1 to the fifteenth page PG15, the memory controller 200 may determine that the fourth page PG4 is the first erased page FIRST ERASED PAGE (in section S505).

Figure 6:
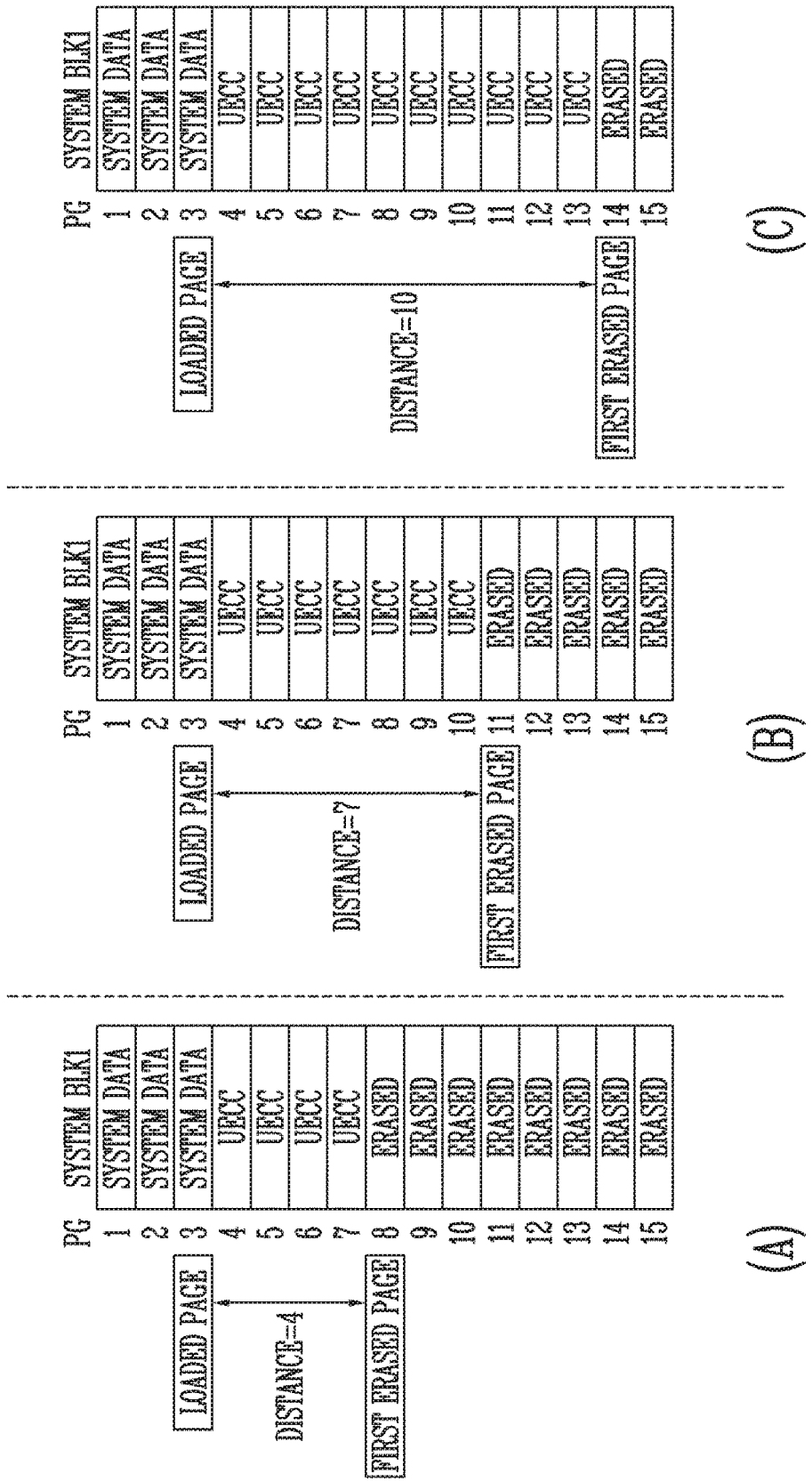
FIG. 6 is a diagram illustrating a method of determining whether to perform a read reclaim operation on a system block in accordance with an embodiment of the present disclosure.

FIG. 6 is a diagram illustrating a method of determining whether to perform a read reclaim operation on the system block 111 in accordance with an embodiment of the present disclosure.

Referring to FIG. 6, due to influence of read disturb, the state of system block 1 SYSTEM BLK1 may change from (A) to (B) and then from (B) to (C).

Referring to (A) of FIG. 6, each of the fourth to seventh pages PG4 to PG7 has data damaged by the read disturb. Referring to (B) of FIG. 6, each of the fourth to tenth pages PG4 to PG10 has data damaged by the read disturb. Referring to (C) of FIG. 6, each of the fourth to thirteenth pages PG4 to PG13 has data damaged by the read disturb.

In the case of (A) of FIG. 6, the first erased page FIRST ERASED PAGE is the eighth page PG8. In the case of (B) of FIG. 6, the first erased page FIRST ERASED PAGE is the eleventh page PG11. In the case of (C) of FIG. 6, the first erased page FIRST ERASED PAGE is the fourteenth page PG14.

In the state of (C) of FIG. 6, if read operations are further performed, the data of all of the fourth to fifteenth pages PG4 to PG15 may be damaged, so that it may be difficult to detect the first erased page. In this case, because attempts to read system data is made from the fifteenth page PG15 in reverse order of the program sequence, the time taken to boot the storage device may be further increased.

In the case of (A) of FIG. 6, the distance between the loaded system data page LOADED PAGE and the first erased page FIRST ERASED PAGE is 4. In the case of (B) of FIG. 6, the distance between the loaded system data page LOADED PAGE and the first erased page FIRST ERASED PAGE is 7. In the case of (C) of FIG. 6, the distance between the loaded system data page LOADED PAGE and the first erased page FIRST ERASED PAGE is 10.

In the case of (C) of FIG. 6, if the threshold distance DISth is set to 8, the memory controller 200 may perform a read reclaim operation on the system block after a system block loading operation has been performed. In various embodiments, the threshold distance DISth may be set to various values. In other words, based on the value of the threshold distance DISth, the memory controller 200 may control a point in time to perform the read reclaim operation on the system block.

FIG. 7 is a diagram illustrating transfer of data of a system block according to the read reclaim operation in accordance with an embodiment of the present disclosure.

Referring to FIG. 7, the system blocks 111 included in the memory device 100 may include system block sets 0 to 3 System Block Set0 to System Block Set3. Here, the number of system block sets in accordance with an embodiment of the present disclosure is not limited to that of the embodiment of FIG. 7.

Each of the system block sets 0 to 3 System Block Set0 to System Block Set3 may include an original system block and a duplication system block.

In various embodiments, each of the original system blocks and the duplication system blocks may include a plurality of pages. In various embodiments, memory cells included in the system block may be formed of single level cells (SLCs) each of which is capable of storing 1-bit data therein.

In the embodiment of FIG. 7, system data is stored in zeroth to third pages PG0 to PG3 of the original system block and the duplication system block of system block set 0 System Block Set0. In FIG. 7, it is assumed that the system block of system block set 0 System Block Set0 is selected as a source block, and the system block of system block set 1 System Block Set1 is selected as a destination block.

The memory controller 200 may transfer, among the system data stored in the zeroth to third pages PG0 to PG3 of the original system block of system block set 0 System Block Set0, the last-programmed system data stored in the third page PG3 to the original system block and the duplication system block of system block set 1 System Block Set1.

In detail, the memory controller 200 may read the system data stored in the third page PG3 of the original system block of system block set 0 System Block Set0. The memory controller 200 may perform an error correction operation on the read system data. The error correction operation may be performed by the ECC circuit 1030 (refer to FIG. 13) included in the memory controller 200.

If the number of error bits included in the read system data is less than the maximum number of error bits capable of being corrected by the ECC circuit 1030, the read operation on the system data is a pass. Then, the memory controller 200 may perform a program operation such that the read system data is stored to the original system block and the duplication system block of system block set 1 System Block Set1.

In various embodiments, the read reclaim operation on the system block may be performed during an idle period of the memory device. In various embodiments, although in FIG. 7 there is illustrated the case where only the last-programmed system data of the third page PG3 is transferred to system block set 1 System Block Set1, this is only for convenience of explanation. In various embodiments, all system data included in the source block may be transferred to the destination block.

In various embodiments of the present disclosure, the read reclaim operation of the system block may be performed based on the distance between the first erased page obtained during the system block loading operation and the loaded system data page in which loaded system data is stored. Consequently, the time taken to perform a booting operation may be fundamentally prevented from being increased by repeatedly performing read operations on the system block.

In various embodiments, the read reclaim control unit 210 described with reference to FIG. 1 may perform the read reclaim operation on the system block described with reference to FIGS. 2 to 7.

FIG. 8 is a diagram illustrating an exemplary configuration of the memory device 100 of FIG. 1.

Referring to FIG. 8, the memory device 100 may include a memory cell array 110, a peripheral circuit 120, and a control logic 130.

The memory cell array 110 may include a plurality of memory blocks BLK1 to BLKz. The plurality of memory blocks BLK1 to BLKz are coupled to the address decoder 121 through row lines RL. The memory blocks BLK1 to BLKz may be coupled to the read/write circuit 123 through bit lines BL1 to BLm. Each of the memory blocks BLK1 to BLKz may include a plurality of memory cells. In various embodiments, the plurality of memory cells may be non-volatile memory cells. Memory cells coupled to the same word line among the plurality of memory cells are defined as one page. In other words, the memory cell array 110 is formed of a plurality of pages. In various embodiments, each of the memory blocks BLK1 to BLKz included in the memory cell array 110 may include a plurality of dummy cells. Here, one or more dummy cells may be coupled in series between a drain select transistor and memory cells and between a source select transistor and the memory cells.

Each of the memory cells of the memory device 100 may be formed of a single level cell (SLC) capable of storing a single data bit, a multi-level cell (MLC) capable of storing two data bits, a triple-level cell (TLC) capable of storing three data bits, or a quad-level cell (QLC) capable of storing four data bits.

In various embodiments, some memory blocks of the plurality of memory blocks BLK1 to BLKz may be system blocks. In detail, each system block may be formed of a system block set including an original system block and a duplication system block. In various embodiments, each of the memory cells of the system block may be formed of a single level cell (SLC) capable of storing one data bit.

The peripheral circuit 120 may include an address decoder 121, a voltage generator 122, a read/write circuit 123, and a data input/output circuit 124.

The peripheral circuit 120 may drive the memory cell array 110. For example, the peripheral circuit 120 may drive the memory cell array 110 to perform a program operation, a read operation, or an erase operation.

The address decoder 121 is coupled to the memory cell array 110 through the row lines RL. The row lines RL may include drain select lines, word lines, source select lines, and a common source line. In various embodiments, the word lines may include normal word lines and dummy word lines. In various embodiments, the row lines RL may further include a pipe select line.

The address decoder 121 may operate under control of the control logic 130. The address decoder 121 may receive addresses ADDR from the control logic 130.

The address decoder 121 may decode a block address among the received addresses ADDR. The address decoder 121 selects at least one of the memory blocks BLK1 to BLKz according to the decoded block address. The address decoder 121 may decode a row address among the received addresses ADDR. The address decoder 121 may select at least one word line WL of the selected memory block by applying voltages supplied from the voltage generator 122 to the at least one word line WL according to the decoded row address.

During a program operation, the address decoder 121 may apply a program voltage to a selected word line and apply a pass voltage having a level lower than that of the program voltage to unselected word lines. During a program verify operation, the address decoder 121 may apply a verify voltage to a selected word line and apply a verify pass voltage higher than the verify voltage to unselected word lines.

During a read operation, the address decoder 121 may apply a read voltage to a selected word line and apply a pass voltage higher than the read voltage to unselected word lines.

In various embodiments, an erase operation of the memory device 100 may be performed on a memory block basis. During the erase operation, an address ADDR to be inputted to the memory device 100 includes a block address. The address decoder 121 may decode the block address and select a corresponding one memory block according to the decoded block address. During the erase operation, the address decoder 121 may apply a ground voltage to word lines coupled to the selected memory block.

In various embodiments, the address decoder 121 may decode a column address among the transmitted addresses ADDR. A decoded column address DCA may be transmitted to the read/write circuit 123. In various embodiments, the address decoder 121 may include components such as a row decoder, a column decoder, and an address buffer.

The voltage generator 122 may generate a plurality of voltages using an external power voltage supplied to the memory device 100. The voltage generator 122 is operated under control of the control logic 130.

In various embodiments, the voltage generator 122 may generate an internal supply voltage by regulating an external supply voltage. The internal supply voltage generated from the voltage generator 122 may be used as an operating voltage of the memory device 100.

In various embodiments, the voltage generator 122 may produce a plurality of voltages using the external supply voltage or the internal supply voltage. The voltage generator 122 may generate various voltages required in the memory device 100. For example, the voltage generator 122 may generate a plurality of program voltages, a plurality of pass voltages, a plurality of select read voltages, and a plurality of unselect read voltages.

For example, the voltage generator 122 may include a plurality of pumping capacitors for receiving the internal supply voltage, and generate a plurality of voltages by selectively enabling the plurality of pumping capacitors under control of the control logic 130.

The generated voltages may be supplied to the memory cell array 110 by the address decoder 121.

The read/write circuit 123 may include first to math page buffers PB1 to PBm. The first to math page buffers PB1 to PBm are coupled to the memory cell array 110 through the first to m-th bit lines BL1 to BLm, respectively. The first to math page buffers PB1 to PBm may operate under control of the control logic 130.

The first to math page buffers PB1 to PBm may perform data communication with the data input/output circuit 124. During a program operation, the first to math page buffers PB1 to PBm may receive data DATA to be stored through the data input/output circuit 124 and data lines DL.

During a program operation, the first to math page buffers PB1 to PBm may transmit the data DATA, received through the data input/output circuit 124, to selected memory cells through the bit lines BL1 to BLm when a program pulse is applied to a selected word line. The memory cells in the selected page are programmed based on the transmitted data DATA. Memory cells coupled to a bit line to which a program allowable voltage (e.g. a ground voltage) is applied may have increased threshold voltages. Threshold voltages of memory cells coupled to a bit line to which a program inhibit voltage (for example, a supply voltage) is applied may be retained. During a program verify operation, the first to m-th page buffers PB1 to PBm may read page data from selected memory cells through the bit lines BL1 to BLm.

During a read operation, the read/write circuit 123 may read data DATA from the memory cells in the selected page through the bit lines BL, and output the read data DATA to the data input/output circuit 124.

During an erase operation, the read/write circuit 123 may float the bit lines BL. In various embodiments, the read/write circuit 123 may include a row select circuit.

The data input/output circuit 124 is coupled to the first to m-th page buffers PB1 to PBm through the data lines DL. The data input/output circuit 124 may operate under control of the control logic 130.

The data input/output circuit 124 may include a plurality of input/output buffers (not shown) which receive input data. During a program operation, the data input/output circuit 124 may receive data DATA to be stored from an external controller (not shown). During a read operation, the data input/output circuit 124 may output, to the external controller, the data received from the first to m-th page buffers PB1 to PBm included in the read/write circuit 123.

The control logic 130 may be coupled to the address decoder 121, the voltage generator 122, the read/write circuit 123, and the data input/output circuit 124. The control logic 130 may control the overall operation of the memory device 100. The control logic 130 may operate in response to a command CMD transmitted from an external device.

Figure 9:
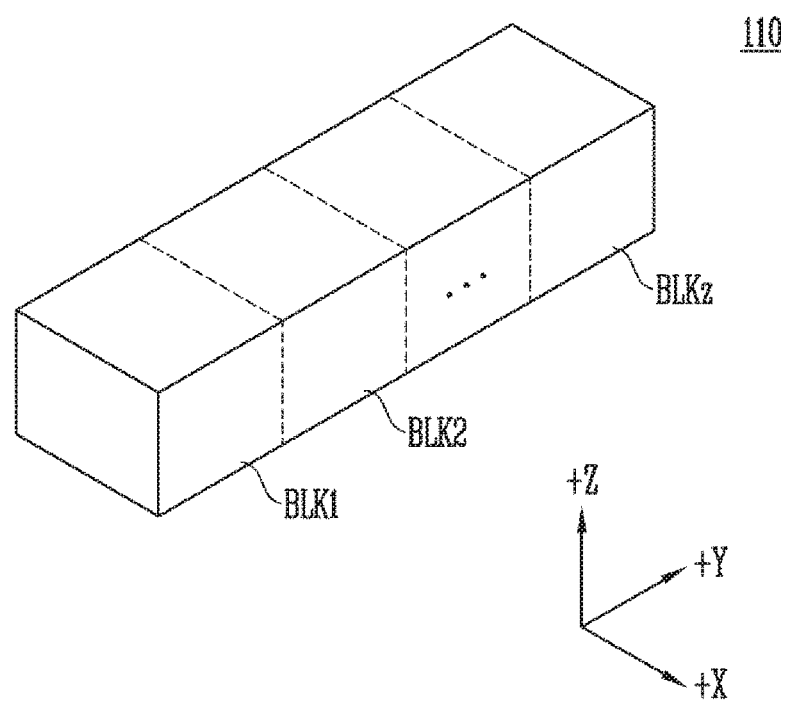
FIG. 9 is a diagram illustrating an example of a memory cell array shown in FIG. 8.

FIG. 9 is a diagram illustrating an example of the memory cell array of FIG. 8.

Referring to FIG. 9, the memory cell array 110 may include a plurality of memory blocks BLK1 to BLKz. Each memory block may have a three-dimensional structure. Each memory block may include a plurality of memory cells stacked on a substrate. The memory cells are arranged in a +X direction, a +Y direction, and a +Z direction. The structure of each memory block will be described in more detail with reference to FIGS. 10 and 11.

Figure 10:
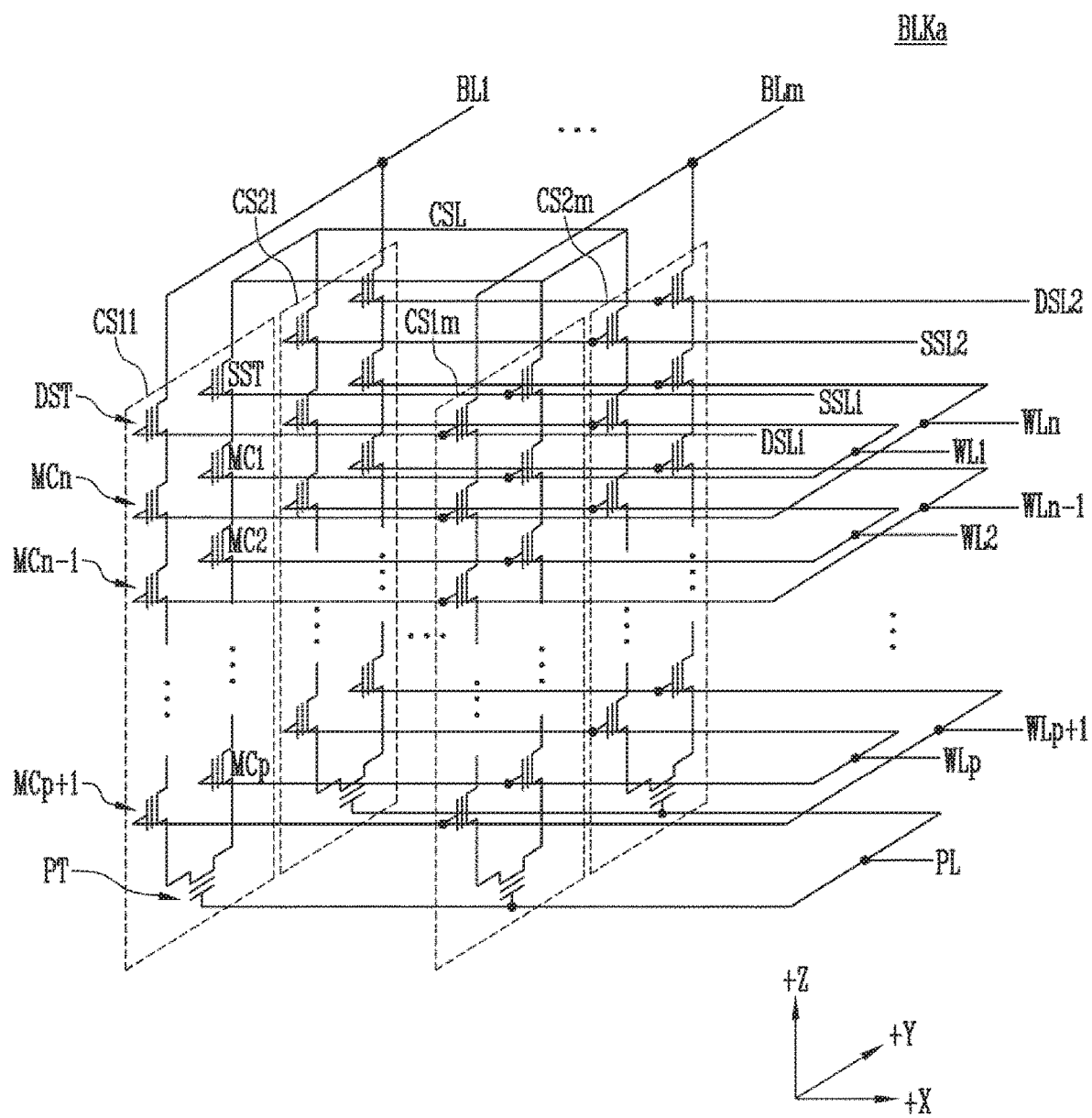
FIG. 10 is a circuit diagram illustrating a memory block shown in FIG. 9 in accordance with an embodiment of the present disclosure.

FIG. 10 is a circuit diagram illustrating any one BLKa of memory blocks BLK1 to BLKz of FIG. 9 in accordance with an embodiment of the present disclosure.

Referring to FIG. 10, the memory block BLKa may include a plurality of cell strings CS11 to CS1m and CS21 to CS2m. In various embodiments, each of the cell strings CS11 to CS1m and CS21 to CS2m may be formed in a 'U' shape. In the memory block BLKa, m cell strings may be arranged in a row direction (i.e., the +X direction). In FIG. 10, two cell strings are illustrated as being arranged in a column direction (i.e., the +Y direction). However, this illustration is made for convenience of description, and it will be understood that three or more cell strings may be arranged in the column direction.

Each of the plurality of cell strings CS11 to CS1m and CS21 to CS2m may include at least one source select transistor SST, first to n-th memory cells MC1 to MCn, a pipe transistor PT, and at least one drain select transistor DST.

The select transistors SST and DST and the memory cells MC1 to MCn may have structures similar to each other. In various embodiments, each of the select transistors SST and DST and the memory cells MC1 to MCn may include a channel layer, a tunneling insulating layer, a charge storage layer, and a blocking insulating layer. In various embodiments, a pillar for providing the channel layer may be provided in each cell string. In various embodiments, a pillar for providing at least one of the channel layer, the tunneling insulating layer, the charge storage layer, and the blocking insulating layer may be provided in each cell string.

The source select transistor SST of each cell string is coupled between the common source line CSL and the memory cells MC1 to MCp.

In various embodiments, source select transistors of cell strings arranged in the same row are coupled to a source select line extending in a row direction, and source select transistors of cell strings arranged in different rows are coupled to different source select lines. In FIG. 10, source select transistors of the cell strings CS11 to CS1m in a first row are coupled to a first source select line SSL1. Source select transistors of the cell strings CS21 to CS2m in a second row are coupled to a second source select line SSL2.

In various embodiments, the source select transistors of the cell strings CS11 to CS1m and CS21 to CS2m may be coupled in common to a single source select line.

The first to n-th memory cells MC1 to MCn in each cell string are coupled between the source select transistor SST and the drain select transistor DST.

The first to n-th memory cells MC1 to MCn may be divided into first to p-th memory cells MC1 to MCp and p+1-th to n-th memory cells MCp+1 to MCn. The first to p-th memory cells MC1 to MCp are successively arranged in a direction opposite to the +Z direction and are coupled in series between the source select transistor SST and the pipe transistor PT. The p+1-th to n-th memory cells MCp+1 to MCn are successively arranged in the +Z direction and are coupled in series between the pipe transistor PT and the drain select transistor DST. The first to p-th memory cells MC1 to MCp and the p+1-th to n-th memory cells MCp+1 to MCn are coupled to each other through the pipe transistor PT. The gates of the first to nth memory cells MC1 to MCn of each cell string are coupled to first to n-th word lines WL1 to WLn, respectively.

A gate of the pipe transistor PT of each cell string is coupled to a pipeline PL.

The drain select transistor DST of each cell string is coupled between the corresponding bit line and the memory cells MCp+1 to MCn. The cell strings arranged in the row direction are coupled to drain select lines extending in the row direction. Drain select transistors of the cell strings CS11 to CS1m in the first row are coupled to a first drain select line DSL1. Drain select transistors of the cell strings CS21 to CS2m in the second row are coupled to a second drain select line DSL2.

Cell strings arranged in the column direction may be coupled to bit lines extending in the column direction. In FIG. 10, cell strings CS11 and CS21 in a first column are coupled to a first bit line BL1. Cell strings CS1m and CS2m in an m-th column are coupled to an m-th bit line BLm.

Memory cells coupled to the same word line in cell strings arranged in the row direction form a single page. For example, memory cells coupled to the first word line WL1, among the cell strings CS11 to CS1m in the first row, form a single page. Memory cells coupled to the first word line WL1, among the cell strings CS21 to CS2m in the second row, form another single page. Cell strings arranged in the direction of a single row may be selected by selecting any one of the drain select lines DSL1 and DSL2. One page may be selected from among the selected cell strings by selecting any one of the word lines WL1 to WLn.

In various embodiments, even bit lines and odd bit lines may be provided in lieu of the first to m-th bit lines BL1 to BLm. Even-number-th cell strings of the cell strings CS11 to CS1$m$ or CS21 to CS2$m$ arranged in the row direction may be coupled to respective even bit lines. Odd-number-th cell strings of the cell strings CS11 to CS1$m$ or CS21 to CS2$m$ arranged in the row direction may be coupled to respective odd bit lines.

In various embodiments, at least one or more of the first to n-th memory cells MC1 to MCn may be used as a dummy memory cell. For example, the at least one or more dummy memory cells may be provided to reduce an electric field between the source select transistor SST and the memory cells MC1 to MCp. Alternatively, the at least one or more dummy memory cells may be provided to reduce an electric field between the drain select transistor DST and the memory cells MCp+1 to MCn. As the number of dummy memory cells is increased, the reliability in operation of the memory block BLKa may be increased, while the size of the memory block BLKa may be increased. As the number of dummy memory cells is reduced, the size of the memory block BLKa may be reduced, but the reliability in operation of the memory block BLKa may be reduced.

To efficiently control the at least one dummy memory cells, each of the dummy memory cells may have a required threshold voltage. Before or after an erase operation on the memory block BLKa is performed, program operations may be performed on all or some of the dummy memory cells. In the case where an erase operation is performed after a program operation has been performed, the dummy memory cells may have required threshold voltages by controlling a voltage to be applied to the dummy word lines coupled to the respective dummy memory cells.

Figure 11:
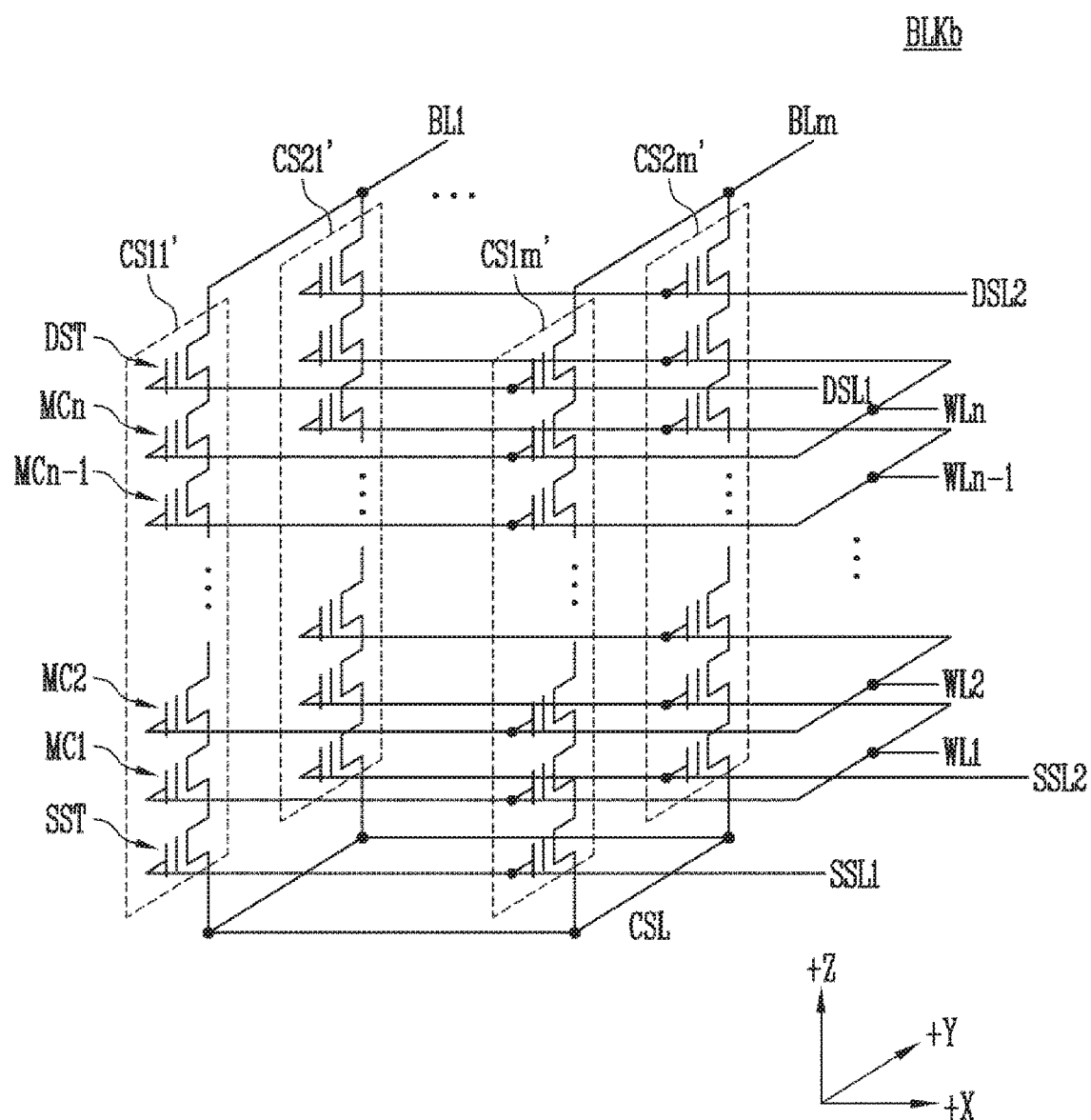
FIG. 11 is a circuit diagram illustrating a memory block shown in FIG. 9 in accordance with an embodiment of the present disclosure.

FIG. 11 is a circuit diagram illustrating any one BLKb of memory blocks BLK1 to BLKz of FIG. 9 in accordance with an embodiment of the present disclosure.

Referring to FIG. 11, a memory block BLKb may include a plurality of cell strings CS11' to CS1$m$' and CS21' to CS2$m$'. Each of the cell strings CS11' to CS1$m$' and CS21' to CS2$m$' extends in the +Z direction. Each of the cell strings CS11' to CS1$m$' and CS21' to CS2$m$' may include at least one source select transistor SST, first to nth memory cells MC1 to MCn, and at least one drain select transistor DST which are stacked on a substrate (not shown) provided in a lower portion of the memory block BLK1'.

The source select transistor SST of each cell string is coupled between the common source line CSL and the memory cells MC1 to MCn. The source select transistors of cell strings arranged in the same row are coupled to the same source select line. Source select transistors of the cell strings CS11' to CS1$m$' arranged in a first row may be coupled to a first source select line SSL1. Source select transistors of the cell strings CS21' to CS2$m$' arranged in a second row may be coupled to a second source select line SSL2. In various embodiments, source select transistors of the cell strings CS11' to CS1$m$' and CS21' to CS2$m$' may be coupled in common to a single source select line.

The first to n-th memory cells MC1 to MCn in each cell string are coupled in series between the source select transistor SST and the drain select transistor DST. Gates of the first to n-th memory cells MC1 to MCn are respectively coupled to first to n-th word lines WL1 to WLn.

The drain select transistor DST of each cell string is coupled between the corresponding bit line and the memory cells MC1 to MCn. Drain select transistors of cell strings arranged in the row direction may be coupled to drain select lines extending in the row direction. Drain select transistors of the cell strings CS11' to CS1$m$' in the first row are coupled to a first drain select line DSL1. Drain select transistors of the cell strings CS21' to CS2$m$' in the second row may be coupled to a second drain select line DSL2.

Consequentially, the memory block BLKb of FIG. 11 may have an equivalent circuit similar to that of the memory block BLKa of FIG. 10 except that a pipe transistor PT is excluded from each cell string.

In various embodiments, even bit lines and odd bit lines may be provided in lieu of the first to m-th bit lines BL1 to BLm. Even-number-th cell strings among the cell strings CS11' to CS1$m$' or CS21' to CS2$m$' arranged in the row direction may be coupled to the respective even bit lines, and odd-number-th cell strings among the cell strings CS11' to CS1$m$' or CS21' to CS2$m$' arranged in the row direction may be coupled to the respective odd bit lines.

In various embodiments, at least one or more of the first to n-th memory cells MC1 to MCn may be used as a dummy memory cell. For example, the at least one or more dummy memory cells may be provided to reduce an electric field between the source select transistor SST and the memory cells MC1 to MCn. Alternatively, the at least one or more dummy memory cells may be provided to reduce an electric field between the drain select transistor DST and the memory cells MC1 to MCn. As the number of dummy memory cells is increased, the reliability in operation of the memory block BLKb may be increased, while the size of the memory block BLKb may be increased. As the number of dummy memory cells is reduced, the size of the memory block BLKb may be reduced, but the reliability in operation of the memory block BLKb may be reduced.

To efficiently control the at least one dummy memory cells, each of the dummy memory cells may have a required threshold voltage. Before or after an erase operation on the memory block BLKb is performed, program operations may be performed on all or some of the dummy memory cells. In the case where an erase operation is performed after a program operation has been performed, the dummy memory cells may have required threshold voltages by controlling a voltage to be applied to the dummy word lines coupled to the respective dummy memory cells.

Figure 12:
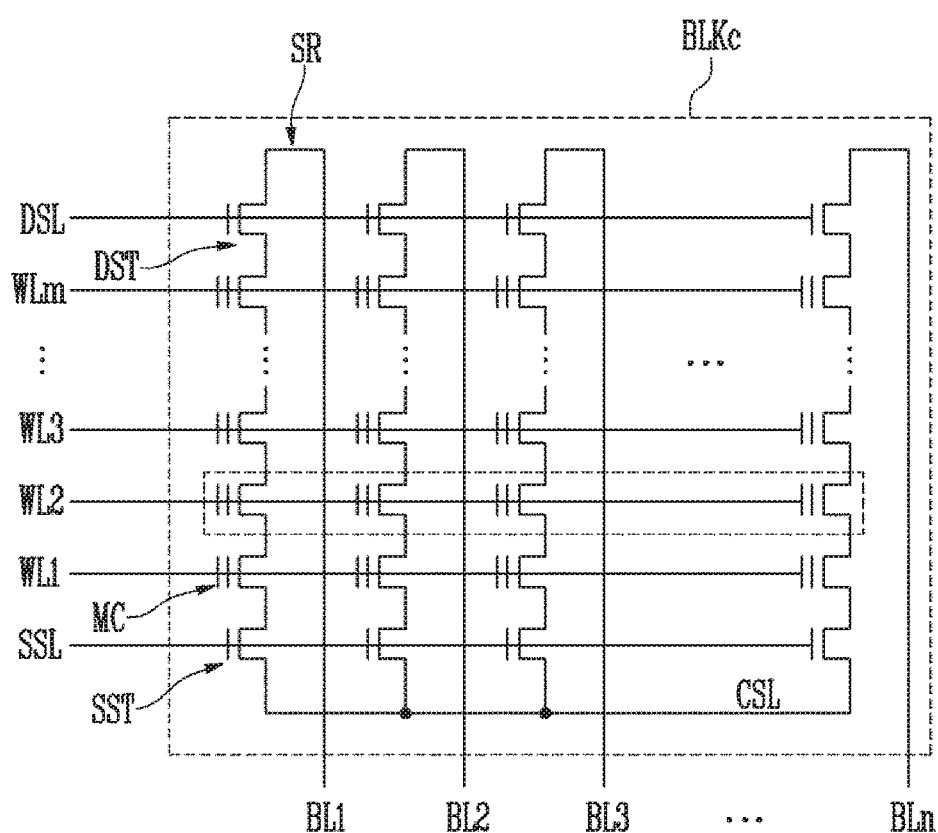
FIG. 12 is a circuit diagram illustrating a memory block included in the memory cell array (110) of FIG. 8 in accordance with an embodiment of the present disclosure.

FIG. 12 is a circuit diagram illustrating any one BLKc of the memory blocks BLK1 to BLKz included in the memory cell array 110 of FIG. 8 in accordance with an embodiment of the present disclosure.

Referring to FIG. 12, the memory block BKLc may include a plurality of strings SR. The plurality of strings SR may be respectively coupled to a plurality of bit lines BL1 to BLn. Each string SR may include a source select transistor SST, memory cells MC, and a drain select transistor DST.

The source select transistor SST of each string SR may be coupled between the memory cells MC and a common source line CSL. The source select transistors SST of the strings SR may be coupled in common to the common source line CSL.

The drain select transistor DST of each string SR may be coupled between the memory cells MC and the corresponding bit line BL. The drain select transistors DST of the strings SR may be respectively coupled the bit lines BL1 to BLn.

In each string SR, a plurality of memory cells MC may be provided between the source select transistor SST and the drain select transistor DST. In each string SR, the memory cells MC may be coupled in series with each other.

In the strings SR, memory cells MC disposed in the same turn from the common source line CSL may be coupled in common to a single word line. The memory cells MC of the strings SR may be coupled to a plurality of word lines WL1 to WLm.

In the memory block BLKc, an erase operation may be performed on a memory block basis. When the erase operation is performed on a memory block basis, all memory cells of the memory block BLKc may be simultaneously erased in response to an erase request.

Figure 13:
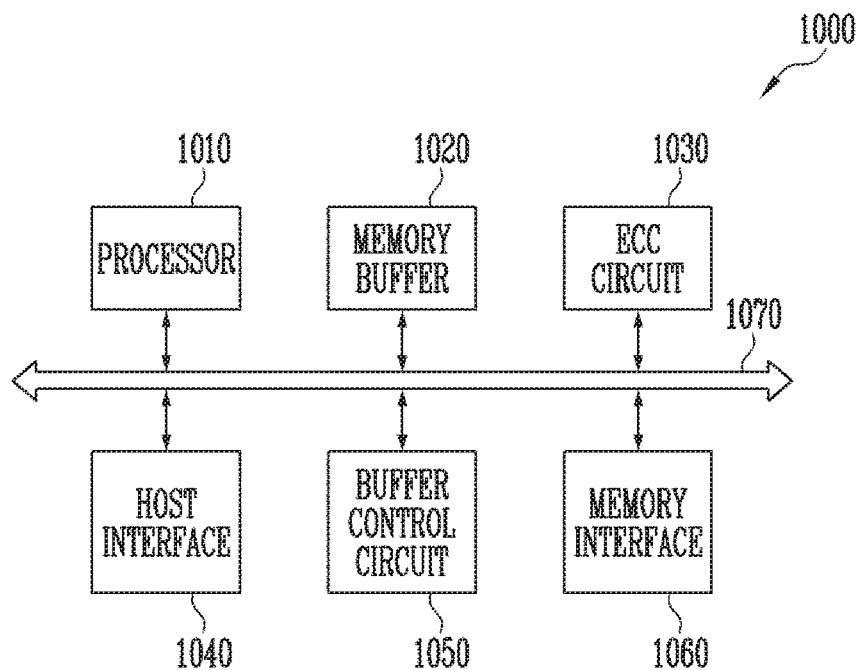
FIG. 13 is a diagram illustrating an example of the memory controller shown in FIG. 1 in accordance with an embodiment of the present disclosure.

FIG. 13 is a diagram illustrating an example of the memory controller 200 of FIG. 1.

The memory controller 1000 is coupled to the host and the memory device 100. In response to a request from the host, the controller 1000 may access the memory device 100. For example, the memory controller 1000 may control a write operation, a read operation, an erase operation, and a background operation of the memory device 100. The memory controller 1000 may provide an interface between the memory device 100 and the host. The memory controller 1000 may drive firmware for controlling the memory device 100.

Referring to FIG. 13, the memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may provide a channel between the components of the memory controller 1000.

The processor 1010 may control the overall operation of the memory controller 1000 and perform a logical operation. The processor 1010 may communicate with the external host through the host interface 1040, and communicate with the memory device 100 through the memory interface 1060. In addition, the processor 1010 may communicate with the memory buffer 1020 through the buffer control circuit 1050. The processor 1010 may control the operation of the storage device 50 using the memory buffer 1020 as an operation memory, a cache memory, or a buffer memory.

The processor 1010 may perform the function of a flash translation layer (FTL). The processor 1010 may translate a logical block address (LBA), provided by the host, into a physical block address (PBA) through the FTL. The FTL may receive the LBA using a mapping table and translate the LBA into the PBA. An address mapping method using the FTL may be modified in various ways based on the unit of mapping. Representative address mapping methods may include a page mapping method, a block mapping method, and a hybrid mapping method.

The processor 1010 may randomize data received from the host. For example, the processor 1010 may use a randomizing seed to randomize data received from the host. Randomized data may be provided to the memory device 100 as data to be stored, and may be programmed to the memory cell array.

During a read operation, the processor 1010 may derandomize data received from the memory device 100. For example, the processor 1010 may use a derandomizing seed to derandomize data received from the memory device 100. Derandomized data may be output to the host.

In various embodiments, the processor 1010 may drive software or firmware to perform the randomizing operation or the derandomizing operation.

In various embodiments, the processor 1010 may perform the operation of the read reclaim control unit 210 described with reference to FIG. 1.

The memory buffer 1020 may be used as an operation memory, a cache memory, or a buffer memory of the processor 1010. The memory buffer 1020 may store codes and commands to be executed by the processor 1010. The memory buffer 1020 may store data to be processed by the processor 1010. The memory buffer 1020 may include a static RAM (SRAM) or a dynamic RAM (DRAM).

The ECC circuit 1030 may perform error correction. The ECC circuit 1030 may perform an ECC encoding operation based on data to be written to the memory device 100 through the memory interface 1060. ECC encoded data may be transmitted to the memory device 100 through the memory interface 1060. The ECC circuit 1030 may perform an ECC decoding operation on data received from the memory device 100 through the memory interface 1060. For example, the ECC circuit 1030 may be included in the memory interface 1060 as a component of the memory interface 1060.

The host interface 1040 may communicate with the external host under control of the processor 1010. The host interface 1040 may perform communication using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), multiMedia card (MMC), an embedded MMC (eMMC), a dual in-line memory module (DIMM), a registered DIMM (RDIMM), and a load reduced DIMM (LRDIMM). In various embodiments, the host interface 1040 may be included in the host controller 202 described with reference to FIG. 3.

The buffer control circuit 1050 may control the memory buffer 1020 under control of the processor 1010.

The memory interface 1060 may communicate with the memory device 100 under control of the processor 1010. The memory interface 1060 may communicate a command, an address, and data with the memory device 100 through the channel.

For example, the memory controller 1000 may include neither the memory buffer 1020 nor the buffer control circuit 1050.

For example, the processor 1010 may use codes to control the operation of the memory controller 1000. The processor 1010 may load codes from a nonvolatile memory device (e.g., a read only memory) provided in the memory controller 1000. Alternatively, the processor 1010 may load codes from the memory device 100 through the memory interface 1060.

For example, the bus 1070 of the memory controller 1000 may be divided into a control bus and a data bus. The data bus may transmit data in the memory controller 1000. The control bus may transmit control information such as a command and an address in the memory controller 1000. The data bus and the control bus may be separated from each other and may neither interfere with each other nor affect each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

Figure 14:
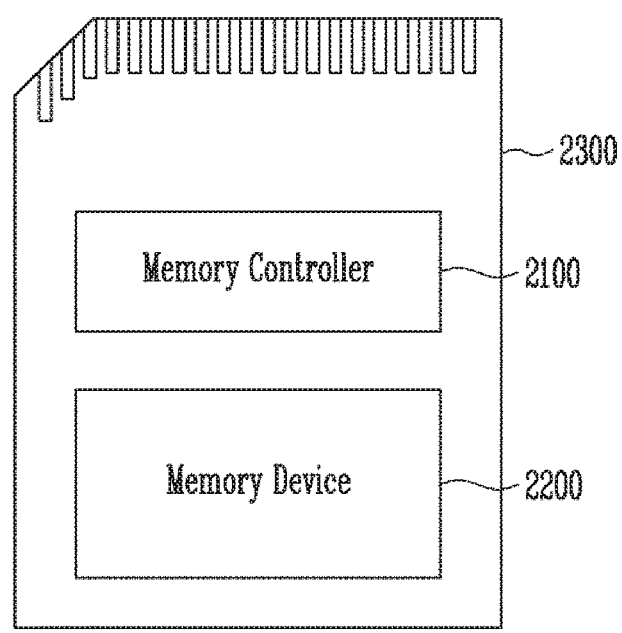
FIG. 14 is a block diagram illustrating a memory card system including a storage device in accordance with an embodiment of the present disclosure.

FIG. 14 is a block diagram illustrating a memory card system 2000 to which a storage device in accordance with an embodiment of the present disclosure is applied.

Referring FIG. 14, the memory card system 2000 may include a memory controller 2100, a memory device 2200 and a connector 2300.

The memory controller 2100 is coupled to the memory device 2200. The memory controller 2100 may access the memory device 2200. For example, the memory controller 2100 may control a read operation, a write operation, an erase operation, and a background operation of the memory device 2200. The memory controller 2100 may provide an interface between the memory device 2100 and the host. The memory controller 2100 may drive firmware for controlling the memory device 2200. The memory controller 2100 may be embodied in the same manner as that of the memory controller 200 described with reference to FIG. 1.

In various embodiments, the memory controller 2100 may include components such as a random-access memory (RAM), a processing unit, a host interface, and a memory interface, and an ECC circuit.

The memory controller 2100 may communicate with an external device through the connector 2300. The memory controller 2100 may communicate with an external device (e.g., a host) based on a specific communication protocol. In various embodiments, the memory controller 2100 may communicate with the external device through at least one of various communication protocols such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) protocols. In various embodiments, the connector 2300 may be defined by at least one of the above-described various communication protocols.

In various embodiments, the memory device 2200 may be implemented as any of various nonvolatile memory devices, such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-torque magnetic RAM (STT-MRAM).

In various embodiments, the memory controller 2100 and the memory device 2200 may be integrated into a single semiconductor device to form a memory card. For example, the memory controller 2100 and the memory device 2200 may be integrated into a single semiconductor device to form a memory card such as a personal computer memory card international association (PCMCIA), a compact flash card (CF), a smart media card (SM or SMC), a memory stick, a multimedia card (MMC, RS-MMC, or MMCmicro), a SD card (SD, miniSD, microSD, or SDHC), or a universal flash storage (UFS).

In various embodiments, the memory controller 2100 may perform the operation of the read reclaim control unit 210 described with reference to FIG. 1.

Figure 15:
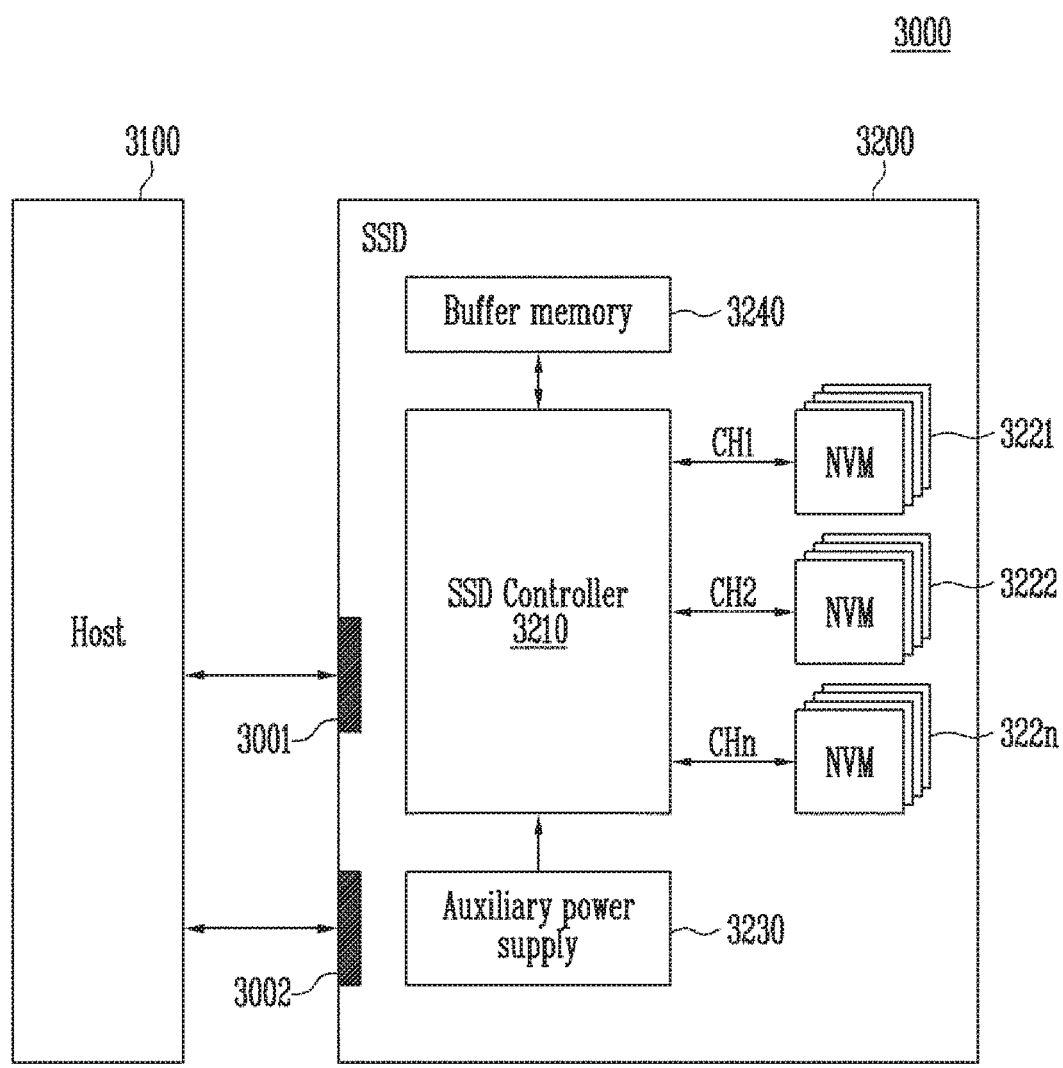
FIG. 15 is a block diagram illustrating a solid-state drive (SSD) system to which the storage device in accordance with an embodiment of the present disclosure is applied.

FIG. 15 is a block diagram illustrating a solid-state drive (SSD) system 3000 to which the storage device in accordance with an embodiment of the present disclosure is applied.

Referring to FIG. 15, the SSD system 3000 may include a host 3100 and an SSD 3200. The SSD 3200 may exchange signals with the host 3100 through a signal connector 3001 and may receive power through a power connector 3002. The SSD 3200 may include an SSD controller 3210, a plurality of flash memories 3221 to 322n, an auxiliary power supply 3230, and a buffer memory 3240.

In various embodiments, the SSD controller 3210 may perform the function of the memory controller 200, described above with reference to FIG. 1.

The SSD controller 3210 may control the plurality of flash memories 3221 to 322n in response to the signals received from the host 3100. In various embodiments, the signals may be signals based on the interfaces of the host 3100 and the SSD 3200. For example, the signals may be signals defined by at least one of various interfaces such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power from the host 3100 and may be charged. The auxiliary power supply 3230 may supply the power of the SSD 3200 when the supply of power from the host 3100 is not smoothly performed. In various embodiments, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322n or may temporarily store metadata (e.g., mapping tables) of the flash memories 3221 to 322n. The buffer memory 3240 may include volatile memories such as DRAM, SDRAM, DDR SDRAM, LPDDR SDRAM, and GRAM or nonvolatile memories such as FRAM, ReRAM, STT-MRAM, and PRAM.

Figure 16:
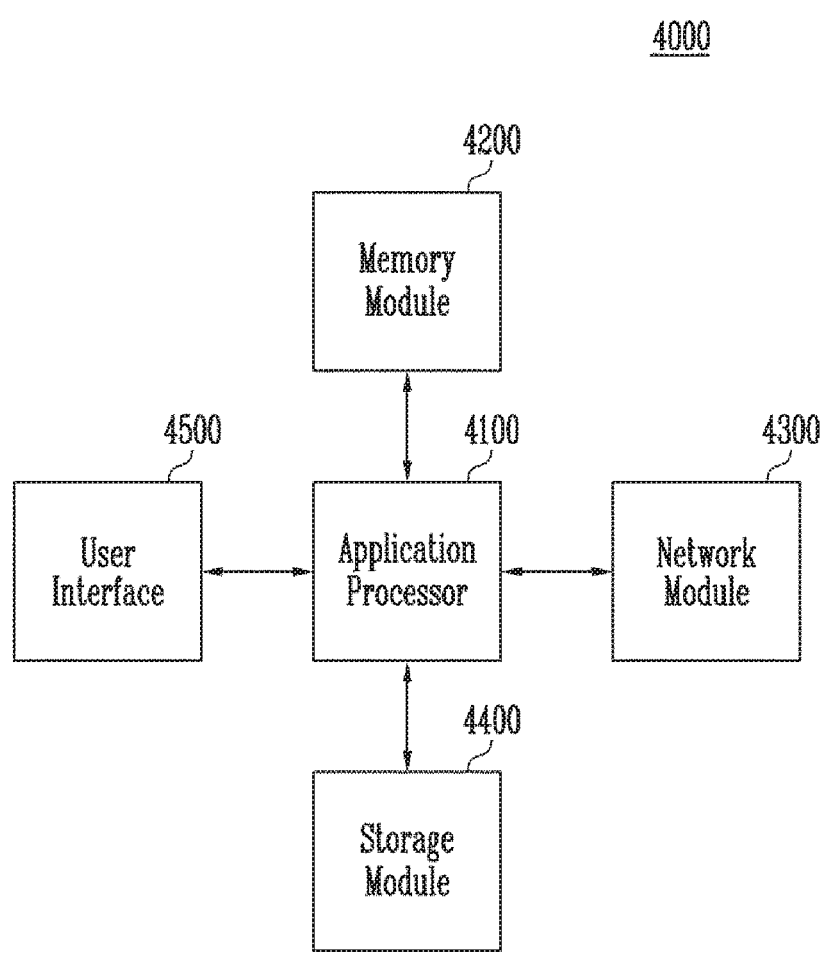
FIG. 16 is a block diagram illustrating a user system including a storage device in accordance with an embodiment of the present disclosure.

FIG. 16 is a block diagram illustrating a user system 4000 to which the storage device in accordance with an embodiment of the present disclosure is applied.

Referring to FIG. 16, the user system 4000 may include an application processor 4100, a memory module 4200, a network module 4300, a storage module 4400, and a user interface 4500.

The application processor 4100 may run components included in the user system 4000, an operating system (OS) or a user program. In various embodiments, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDARM, and LPDDR3 SDRAM, or nonvolatile RAMs such as PRAM, ReRAM, MRAM, and FRAM. In various embodiments, the application processor 4100 and the memory module 4200 may be packaged based on package-on-package (POP) and may then be provided as a single semiconductor package.

The network module 4300 may communicate with external devices. For example, the network module 4300 may support wireless communication, such as code division multiple access (CDMA), global system for mobile communication (GSM), wideband CDMA (WCDMA), CDMA-2000, time division multiple access (TDMA), long term evolution (LTE), WiMAX, WLAN, UWB, Bluetooth, or Wi-Fi communication. In various embodiments, the network module 4300 may be included in the application processor 4100.

The storage module 4400 may store data therein. For example, the storage module 4400 may store data received from the application processor 4100. Alternatively, the storage module 4400 may transmit the data stored in the storage module 4400 to the application processor 4100. In various embodiments, the storage module 4400 may be implemented as a nonvolatile semiconductor memory device, such as a phase-change RAM (PRAM), a magnetic RAM (MRAM), a resistive RAM (RRAM), a NAND flash memory, a NOR flash memory, or a NAND flash memory having a three-dimensional (3D) structure. In various embodiments, the storage module 4400 may be provided as a removable storage medium (i.e., removable drive), such as a memory card or an external drive of the user system 400.

In various embodiments, the storage module 4400 may include a plurality of nonvolatile memory devices, and each of the plurality of nonvolatile memory devices may be operated in the same manner as that of the memory device 100, described above with reference to FIGS. 8 to 12. The storage module 4400 may be operated in the same manner as that of the storage device 50, described above with reference to FIG. 1.

The user interface 4500 may include interfaces which input data or instructions to the application processor 4100 or output data to an external device. In various embodiments, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a liquid crystal display (LCD), an organic light emitting diode (OLED) display device, an active matrix OLED (AMOLED) display device, an LED, a speaker, and a motor.

Various embodiments of the present disclosure may provide a storage device including a memory controller which performs a read reclaim operation on a system block, and a method of operating the storage device.

While the exemplary embodiments of the present disclosure have been disclosed for illustrative purposes, those skilled in the art will appreciate that various modifications, additions and substitutions are possible. Therefore, the scope of the present disclosure must be defined by the appended claims and equivalents of the claims rather than by the description preceding them.

In the above-discussed embodiments, all steps may be selectively performed or skipped. In addition, the steps in each embodiment may be not always performed in regular order. Furthermore, the embodiments disclosed in the present specification and the drawings aims to help those with ordinary knowledge in this art more clearly understand the present disclosure rather than aiming to limit the bounds of the present disclosure. In other words, one of ordinary skill in the art to which the present disclosure belongs will be able to easily understand that various modifications are possible based on the technical scope of the present disclosure.

Embodiments of the present disclosure have been described with reference to the accompanying drawings, and specific terms or words used in the description should be construed in accordance with the spirit of the present disclosure without limiting the subject matter thereof. It should be understood that many variations and modifications of the basic inventive concept described herein will still fall within the spirit and scope of the present disclosure as defined in the appended claims and their equivalents.

What is claimed is:

1. A storage device comprising:
    a memory device including a plurality of system blocks; and
    a memory controller configured to perform a read reclaim operation of copying system data stored in a selected system block to another one of the plurality of system blocks using information obtained during loading of the system data into the selected system block,
    wherein the information includes a relation between a first erased system page of the selected system block and a loaded system page of the selected system block.

2. The storage device according to claim 1, wherein, when power is supplied to the storage device, the memory controller detects the first erased page of the selected system block, and performs a system data read operation of reading system data stored in a plurality of programmed pages of the selected system block, in a sequence reverse to a program sequence from the first erased page.

3. The storage device according to claim 2, wherein the memory controller comprises a read reclaim control unit configured to detect the loaded system page which is a page that has passed the system data read operation among the plurality of programmed pages, and perform the read reclaim operation based on a distance between the first erased page and the loaded system page.

4. The storage device according to claim 3, wherein the read reclaim control unit performs the read reclaim operation when the distance between the first erased page and the loaded system page exceeds a preset threshold distance.

5. The storage device according to claim 4, wherein the read reclaim control unit reads at least one or more pages storing the system data of the selected system block, and programs the read data to a system block other than the selected system block among the plurality of system blocks.

6. The storage device according to claim 3, wherein the distance between the first erased page and the loaded system page is increased as the read operation on the selected system block is repeated.

7. The storage device according to claim 2, wherein the first erased page is detected in a binary scan scheme.

8. The storage device according to claim 1, wherein the system data includes setting information to be used to manage the storage device.

9. The storage device according to claim 1, wherein the system data includes a mapping table provided to translate logical addresses included in a request input from an external host into physical addresses of memory cells included in the memory device.

10. A method of operating a memory controller configured to control a memory device including a plurality of system blocks, the method comprising:
    performing a system block loading operation of loading system data stored in a selected system block among the plurality of system blocks; and
    performing a read reclaim operation of copying the system data to another one of the plurality of system blocks using information obtained during the system block loading operation,
    wherein the information includes a relation between a first erased system page of the selected system block and a loaded system page of the selected system block.

11. The method according to claim 10, wherein the performing of the system block loading operation comprises:

detecting the first erased page of the selected system block in a binary scan scheme; and reading, in a sequence reverse to a program sequence from the first erased page, system data stored in a plurality of programmed pages of the selected system block.

12. The method according to claim 11, wherein the performing of the read reclaim operation comprises:

detecting the loaded system data page which is a page that has passed a system data read operation among the plurality of programmed pages; and copying the system data stored in the selected system block to a system block other than the selected system block among the plurality of system blocks based on a distance between the first erased page and the loaded system page.

13. The method according to claim 12, wherein the copying comprises:

reading at least one or more pages storing the system data of the selected system block when the distance between the first erased page and the loaded system page exceeds a threshold distance; and programming data obtained by reading the at least one or more pages to a system block other than the selected system block among the plurality of system blocks.

14. The method according to claim 12, wherein the distance between the first erased page and the loaded system page is increased as the read operation on the selected system block is repeated.

15. The method according to claim 10, wherein the system data includes setting information to be used to operate the memory controller.

16. The method according to claim 10, wherein the system data includes a mapping table provided to translate logical addresses included in a request input from an external host into physical addresses of memory cells included in the memory device.

17. A memory system comprising:

a memory device including:
 a source block storing a system data; and
 a destination block storing a copy of the system data; and a controller including an operation memory, and suitable for:
 controlling the memory device to load the system data from the source block onto the operation memory;
 detecting distance between a first erased system page and a loaded system page storing the loaded system data in the source block; and
 controlling the memory device to copy the system data from the source block into the destination block according to the distance.

* * * * *